March 22, 1938.      E. LAUGAUDIN      2,111,792
IMPROVED SHOCK ABSORBER
Filed July 17, 1935
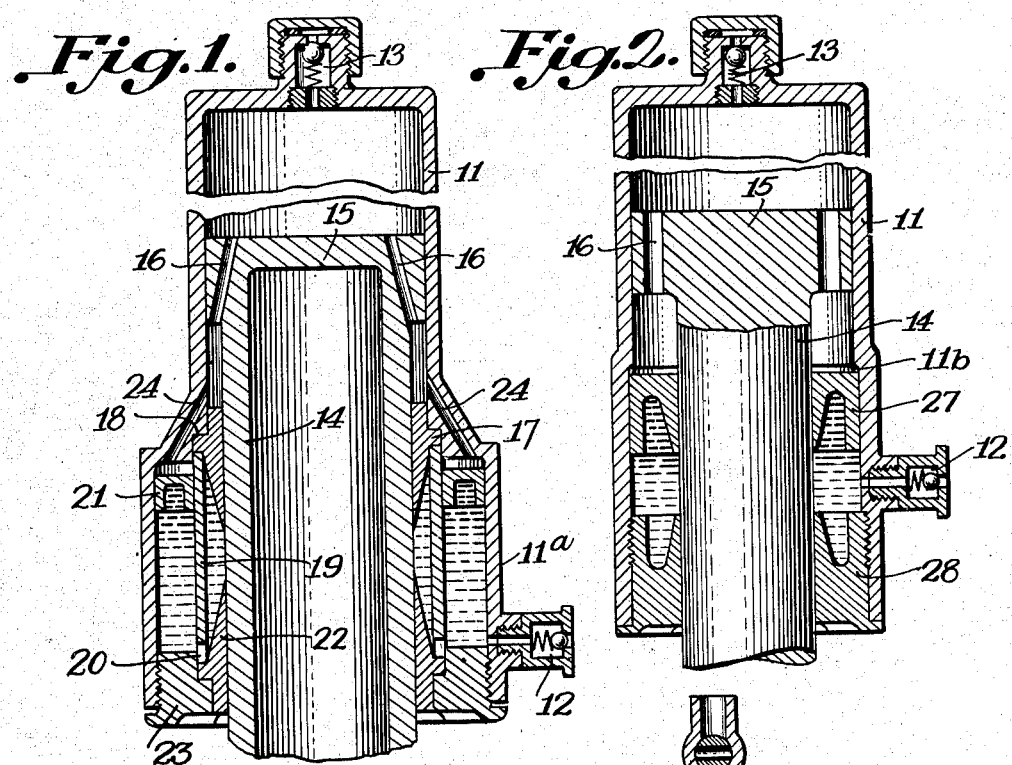
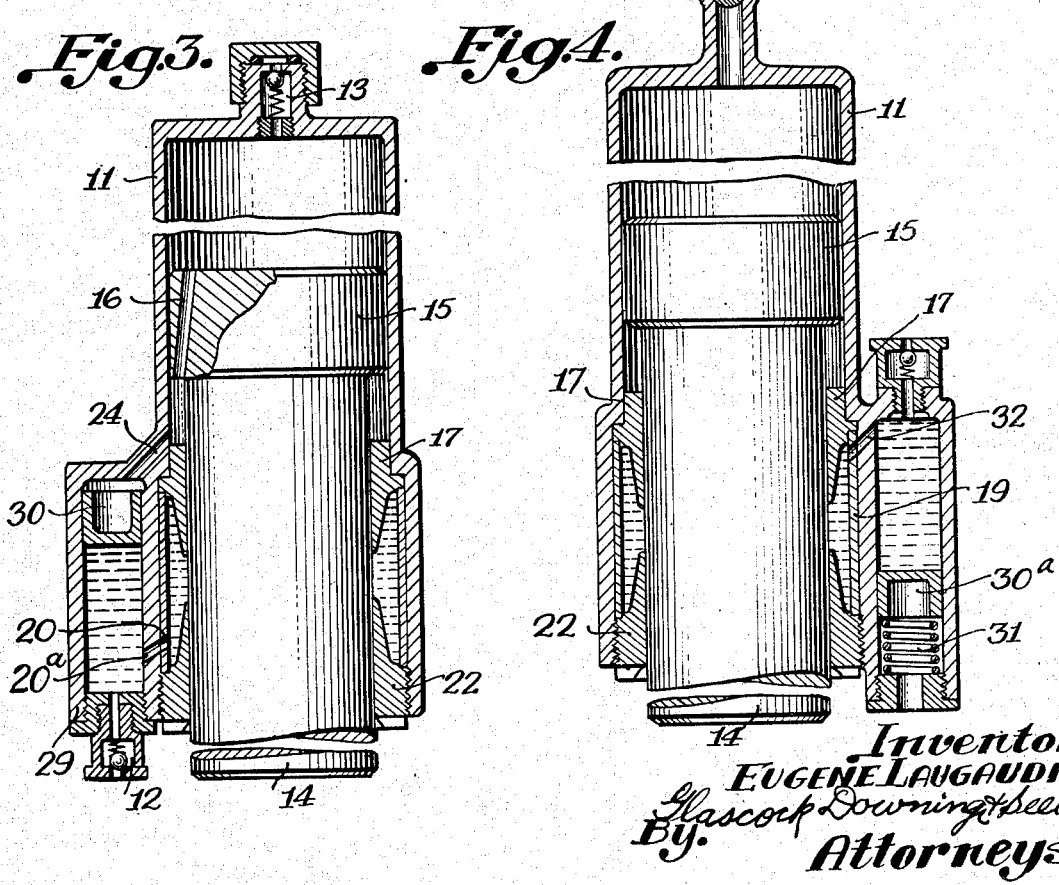
Inventor.
EUGENE LAUGAUDIN.
By Glascock Downing & Seebold
Attorneys.

Patented Mar. 22, 1938

2,111,792

UNITED STATES PATENT OFFICE 2,111,792

IMPROVED SHOCK ABSORBER

Eugene Laugaudin, Paris, France

Application July 17, 1935, Serial No. 31,912
In France July 18, 1934

6 Claims. (Cl. 267—65)

The present invention relates to improvements in shock absorbers constituted by a cylinder containing a fluid, preferably a compressed gaseous fluid, air for example, in which moves by translation or rotation, a main piston, which, under the action of the shocks which it receives, further compresses the air in the cylinder: this compressed air (and further compressed under the action of the shocks), acts on a second or loose piston which transmits the pressure it receives to a liquid fluid interposed between the cylinder and the piston which, in its turn, acts on one or more scraper cups of flexible material or elastic metal having a tapered edge arranged between the piston and the cylinder; the pressure exerted on this liquid fluid pressing the tapered edge of the cups on the piston and ensuring perfect fluid-tightness of the joint thus formed.

Figure 1 is a vertical section of the shock absorber.

Figure 2 is a modification of the invention.

Figure 3 shows another modification of the invention, and Figure 4 shows a further modification of the invention.

As will be seen from Figure 1 the apparatus is composed of a cylinder 11 the lower part 11a of which is of larger diameter than the upper part 11; the piston 14 is terminated by a head 15 forming a guide, lodged in the part 11 of the cylinder; this head is provided with holes 16.

A scraper cup 17 of flexible material or elastic metal with a tapered edge for example, is engaged upon the piston 14 and its base rests on a shoulder of the cylinder and with its tapered edge pressing on the periphery of the piston, a sleeve 19, pierced with holes 20, at its lower part, presses upon the base of the cup 17 and holds it in place as will be explained hereinafter.

In the annular space formed between the wall of the part 11a of the cylinder and the said sleeve is housed an annular cup 21 constituting a loose piston.

A second cup having a tapered edge 22, of the same type as the cup 17, is engaged on the piston 14 and its base presses against the lower part of the sleeve 19; thus as will be seen, the tapered edges of these two cups are facing one another; a plug 23 screwed on to the lower part 11a holds the cups 17 and 22 in place, the fixed spacing between which is ensured by the sleeve 19. Element 12 serves for the introduction of the oil intended to obtain fluid-tightness. 13 is the valve for the introduction of the air compressed in cylinder 11. Conduits 24 place the two parts of the cylinder 11 and 11a into communication with each other.

The working operation will easily be understood; under the action of the shocks, the piston moves in the cylinder further compressing the compressed air which it contains; this latter compressed air, in passing through the holes 16, acts on the annular cup, or the loose piston 21 and the latter transmits to the oil the pressure which it receives and, through the holes 20 of the sleeve 19, transmits this pressure to the scraper cups 17 and 22 the tapered edges of which are thus pressed accurately against the piston 14 thus ensuring perfect fluid-tightness.

The constructional form shown in Figure 2 is a modification of the device illustrated in Figure 1.

In this modification the piston 14 is, as before, provided with a head 15 provided with conduits 16; the annular cup 21 forming the loose piston is combined with the scraper cup 17 of Figure 1; thus a free cup 27 is obtained in the form of an annular cup which is engaged on the piston 14 and its stroke is limited in one direction by the shoulder 11b of the cylinder; the internal wall of this cup which is in contact with the piston has a tapered edge as in Figure 1 and its external wall in contact with the cylinder serves as a guide; on the piston 14 is engaged another cup 28 similar to the previous one and fixed by screwing or the like; on the lower part of the cylinder, the tapered edges of the two cups are arranged face to face as already mentioned; 12 is the orifice for the introduction of the oil; 13 is the valve for the introduction of the compressed air into the cylinder 11.

The operation is similar to that according to Figure 1. The compressed air contained in the top of the cylinder and further compressed by the shocks, passes through the holes 16 of the head 15 and this pressure is exerted directly on the member 27 forming the loose piston and scraper cup tending to move the said member 27 towards cup 28; under this pressure the oil presses the member 28; under this pressure the oil presses the tapered edges of the parts 27—28 accurately against the piston in order to ensure perfect fluid-tightness.

Figure 3 shows another constructional variation of the example illustrated in Figure 1, but in this modification the cup 21, instead of being annular and surrounding the whole of the piston, is arranged in a small auxiliary cylinder 29 and constitutes a small piston 30 on which the pressure of the further compressed air is exerted; the reference numerals of Figure 1 are used to indicate the same parts in this modification.

The operation is the same as in Figure 1, 20a being an opening on the auxiliary cylinder for the passage of the oil.

The apparatus could also operate with a vacuum in the cylinder, in which case the piston moves outwardly under the action of shocks. This would require certain slight modifications, which are indicated in Figure 4, it being understood that the valve 13 is replaced by tubing with a closing member which may be connected with a vacuum pump in such a manner as to complete the vacuum in the cylinder upon placing the members into position or where on account of prolonged use a small quantity of air may accidentally be introduced into the cylinder.

There is no longer any necessity to provide a communication between the cylinder and the auxiliary cylinder. The ducts 24 are omitted and also the ducts 16 in the piston head. As liquid, use will be made of a fluid having a high surface tension, for example mercury.

Finally, atmospheric pressure acts upon the piston 30a of the small auxiliary piston, in order to obtain the necessary pressure to apply the tapered edge of the cups against the piston.

This small piston 30a may also be subjected to the action of a spring 31, tending to press it against the liquid fluid, which acts upon the cups, through the duct 32 and the corresponding apertures in the sleeve 19.

It should be pointed out that in all these constructional forms the tapered edges of the cups form scrapers for the oil which may adhere to the piston.

Each of the fluids used in the apparatus may be liquid or gaseous; preferably the fluid having the highest surface viscosity or tension being placed in the part forming the seal or joint.

Having now described my invention, what I claim as new and desire to secure by Letters Patent is:—

1. A shock absorber comprising a cylinder, a main piston in said cylinder having a non-fluid tight guiding head, a second piston freely displaceable within said cylinder and adapted to separate a mass of liquid fluid and a mass of gaseous fluid contained outside said main piston and in said cylinder, and sealing means formed of at least one flexible cup washer having a tapering skirt interposed between the cylinder and the main piston whereby as the result of pressure exerted on the second piston and transmitted to the liquid fluid the said tapering skirt of said sealing means is pressed closely against the main piston.

2. A shock absorber comprising a cylinder, a main piston in said cylinder having a non-fluid tight guiding head, a second piston freely displaceable within said cylinder and adapted to separate a mass of liquid fluid and a mass of gaseous fluid contained outside said main piston and in said cylinder, and sealing means formed of at least one flexible cup washer mounted on said cylinder, said flexible cup washer interposed between the cylinder and the main piston and having a tapering skirt whereby as the result of pressure exerted on the second piston and transmitted to the liquid fluid the said tapering skirt is pressed closely against the main piston.

3. A shock absorber comprising a cylinder, a main piston including a guiding head dividing the cylinder into an upper and a lower chamber and having communication between said chambers, an auxiliary chamber contained in said cylinder and having communication with said lower chamber, said auxiliary chamber containing a second piston adapted to separate a mass of liquid fluid and a mass of gaseous fluid contained in said latter chamber, and opposed flexible cup washers between said cylinder and piston each having a tapering skirt spacedly arranged to form a space therebetween having communication with said mass of liquid fluid in said auxiliary chamber whereby as the result of pressure exerted on the second piston and transmitted to said mass of liquid fluid the tapering skirts of said opposed flexible cup washers are pressed closely against the piston.

4. A shock absorber comprising a cylinder, a main piston including a guiding head dividing the cylinder into an upper and a lower chamber and having communication between said chambers, an auxiliary chamber contained in said cylinder and having communication with said lower chamber, said auxiliary chamber containing a second piston adapted to separate a mass of liquid fluid and a mass of gaseous fluid contained in said latter chamber, and opposed flexible cup washers on said cylinder, each formed by an annular member having a tapering skirt spacedly arranged to form a space therebetween having communication with said mass of liquid fluid in said auxiliary chamber whereby as the result of pressure exerted on said second piston and transmitted to said mass of liquid fluid the tapering skirts of said opposed flexible cup washers are pressed closely against the piston.

5. A shock absorber comprising a cylinder, a main piston including a guiding head having communication between both sides thereof, a second piston displaceable within said cylinder and adapted to separate a mass of liquid fluid and a mass of gaseous fluid contained in said cylinder, said second piston having a tapering flexible skirt in contact with said piston, and a flexible cup washer secured on said cylinder below said mass of liquid fluid and having a tapering skirt in contact with said piston, whereby as the result of pressure exerted on the second piston and transmitted to the liquid fluid, said tapering skirts are pressed closely against the piston.

6. A shock absorber comprising a cylinder, a main piston having a non-fluid tight guiding head, an auxiliary chamber contained in said cylinder and containing a second piston adapted to separate a mass of liquid fluid and air contained in said chamber, said second piston having spring means acting against said liquid fluid in said auxiliary chamber, and opposed flexible cup washers on said cylinder, each formed by an annular member having a tapering skirt spacedly arranged to form a space therebetween having communication with said mass of liquid fluid in said auxiliary chamber whereby as the result of pressure exerted on said second piston and transmitted to said mass of liquid fluid the tapering skirts of said opposed flexible cup washers are pressed closely against the piston.

EUGÈNE LAUGAUDIN.